(12) United States Patent
Pozin et al.

(10) Patent No.: US 8,465,860 B2
(45) Date of Patent: *Jun. 18, 2013

(54) LITHIUM CELL

(75) Inventors: Michael Pozin, Brookfield, CT (US); Michael Sliger, New Milford, CT (US)

(73) Assignee: The Gillette Company, Boston, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/009,858

(22) Filed: Jan. 23, 2008

(65) Prior Publication Data

US 2009/0186263 A1    Jul. 23, 2009

(51) Int. Cl.
*H01M 6/16* (2006.01)
*H01M 2/02* (2006.01)

(52) U.S. Cl.
USPC ............................................ 429/94; 429/178

(58) Field of Classification Search
USPC .................................................. 429/94, 178
See application file for complete search history.

(56) References Cited

U.S. PATENT DOCUMENTS

| | | | |
|---|---|---|---|
| 4,416,960 A * | 11/1983 | Eustace et al. ................. | 429/335 |
| 4,794,057 A | 12/1988 | Griffin | |
| 4,835,075 A | 5/1989 | Tajima et al. | |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,487,960 A * | 1/1996 | Tanaka ............................ | 429/332 |
| 5,514,491 A | 5/1996 | Webber | |
| 5,698,176 A | 12/1997 | Capparella | |
| 6,218,054 B1 * | 4/2001 | Webber .......................... | 429/335 |
| 6,280,883 B1 | 8/2001 | Lamanna | |
| 6,344,293 B1 * | 2/2002 | Geronov ...................... | 429/218.1 |
| 6,849,360 B2 | 2/2005 | Marple | |
| 6,866,965 B2 | 3/2005 | Lee | |
| 7,157,185 B2 | 1/2007 | Marple | |
| 2003/0118914 A1 | 6/2003 | Mori | |
| 2005/0233214 A1 | 10/2005 | Marple | |
| 2005/0244706 A1 | 11/2005 | Wu | |
| 2005/0277023 A1 | 12/2005 | Marple | |
| 2006/0019161 A1 | 1/2006 | Issaev | |
| 2006/0046152 A1 | 3/2006 | Webber | |

(Continued)

FOREIGN PATENT DOCUMENTS

| | | |
|---|---|---|
| EP | 0486704 A | 5/1992 |
| EP | 0573266 A | 12/1993 |

(Continued)

*Primary Examiner* — Milton I Cano
*Assistant Examiner* — Brent Thomas
(74) *Attorney, Agent, or Firm* — Vladimir Vitenberg; Kevin C. Johnson

(57) ABSTRACT

A primary cell having an anode comprising lithium or lithium alloy and a cathode comprising iron disulfide ($FeS_2$) and carbon particles. The electrolyte comprises a lithium salt dissolved in an organic solvent mixture. The electrolyte contains between about 100 and 2000 parts by weight water per million parts by weight (ppm) electrolyte therein. The electrolyte may contain between about 200 and 2000, or between about 500 and 2000 parts by weight water per million parts by weight electrolyte. A cathode slurry is prepared comprising iron disulfide powder, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

4 Claims, 4 Drawing Sheets

U.S. PATENT DOCUMENTS

| | | |
|---|---|---|
| 2006/0046153 A1 | 3/2006 | Webber |
| 2006/0046154 A1 | 3/2006 | Webber |
| 2006/0228620 A1 | 10/2006 | Martinson |
| 2007/0072076 A1 | 3/2007 | Kolosnitsyn et al. |
| 2007/0202409 A1 | 8/2007 | Yamakawa |
| 2008/0003500 A1* | 1/2008 | Issaev et al. ............ 429/200 |
| 2008/0026293 A1 | 1/2008 | Marple et al. |
| 2008/0026296 A1 | 1/2008 | Bowden et al. |
| 2008/0057403 A1* | 3/2008 | Issaev et al. ............ 429/343 |
| 2008/0254343 A1* | 10/2008 | Kaplin et al. ............ 429/53 |
| 2009/0023054 A1* | 1/2009 | Jiang et al. ............ 429/94 |
| 2009/0208849 A1 | 8/2009 | Pozin |

FOREIGN PATENT DOCUMENTS

| | | |
|---|---|---|
| EP | 0529802 B1 | 4/2000 |
| JP | 2002-075446 | 3/2002 |
| JP | 2007-157332 A | 6/2007 |
| WO | WO 2007/049215 A | 5/2007 |

\* cited by examiner

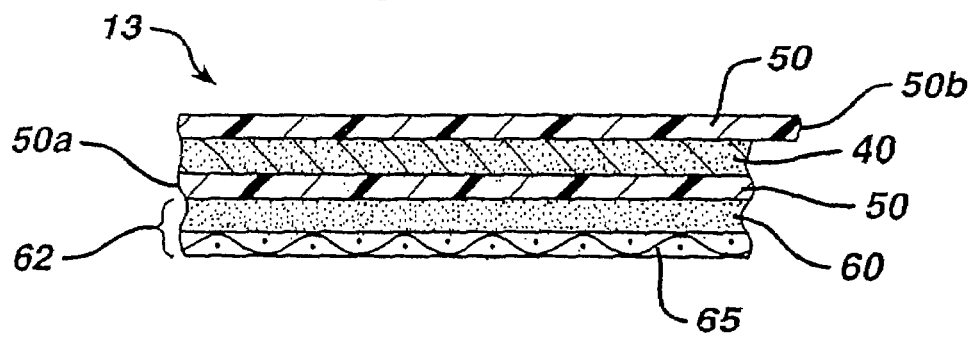
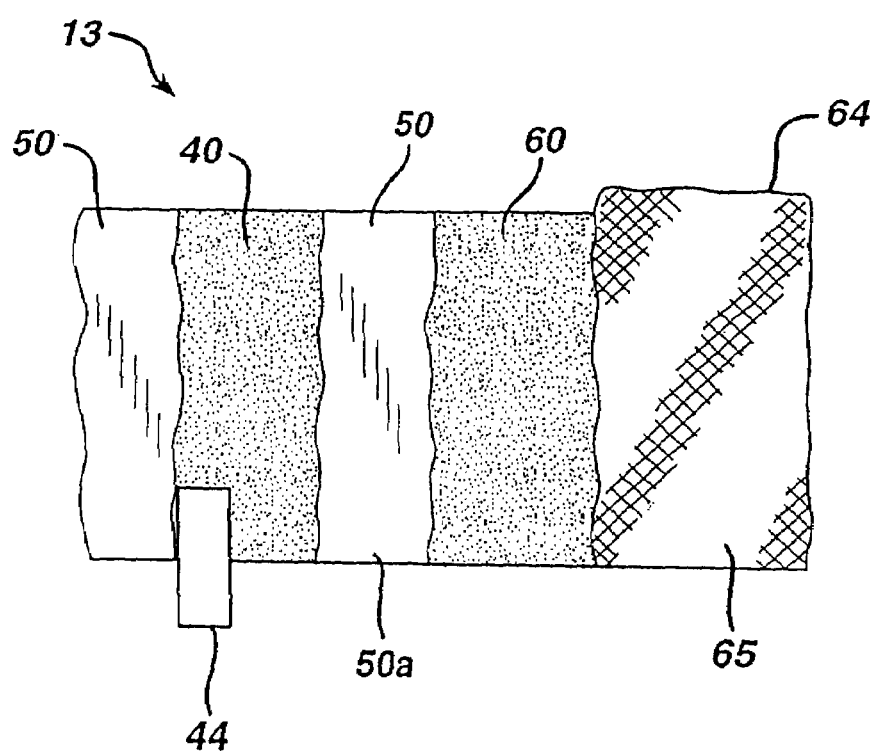

LITHIUM CELL

FIELD OF THE INVENTION

The invention relates to a primary lithium cell having an anode comprising lithium metal or lithium alloy and a cathode comprising iron disulfide and an electrolyte comprising a lithium salt and organic solvents with added water.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in a nonaqueous solvent. The cells are referenced in the art as primary lithium cells (primary $Li/MnO_2$ cells) and are generally not intended to be rechargeable. Alternative primary lithium cells with lithium metal anodes but having different cathodes, are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$. In order to carry out the electrochemical reaction the lithium ions, $Li^+$, produced at the anode must transport through the separator and electrolyte medium and to the cathode.

Overall the $Li/FeS_2$ cell is much more powerful than the same size $Zn/MnO_2$ alkaline cell. That is for a given continuous current drain, particularly at higher current drain over 200 milliAmp, the voltage is flatter for longer periods for the $Li/FeS_2$ cell than the $Zn/MnO_2$ alkaline cell as may be evident in a voltage vs. time profile. This results in a higher energy output obtainable from a $Li/FeS_2$ cell compared to that obtainable for a same size alkaline cell. The higher energy output of the $Li/FeS_2$ cell is also clearly shown more directly in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can be used as a replacement for the same size rechargeable nickel metal hydride cell, which has about the same voltage (fresh) as the $Li/FeS_2$ cell.

The $Li/MnO_2$ cell and $Li/FeS_2$ cell both conventionally employ nonaqueous electrolytes, since the lithium anode is reactive with water. The electrolyte for the $Li/MnO_2$ or $Li/FeS_2$ cell typically comprises specific electrolyte salts such as $LiCF_3SO_3$ (LiTFS) or $Li(CF_3SO_2)_2N$ (LiTFSI) dissolved in specific combinations of organic solvents. Generally, it has been the practice not to add water to the electrolyte solvents and to specify to the supplier that the water content in such solvents be limited to trace amount. That is, it has been the practice that any water present in the electrolyte solvent for the primary $Li/MnO_2$ cell preferably be less than about 50 parts by weight water per one million parts by weight solvent. (See, e.g. U.S. Pat. No. 6,280,883 B1 describing water content in electrolyte solvent for many lithium cells at less than about 100 ppm, preferably less than 50 ppm. (However, the $Li/FeS_2$ cell is not specifically mentioned in this reference.) In any event it has been the practice not to add water to the electrolyte solvent for lithium cells. The supplier may typically subject the electrolyte solvent to drying or purification to assure that the water content in the solvent is well within the purchaser's specification. Such restriction of water content in the electrolyte solvent has been applied in particular to commercial primary $Li/MnO_2$ cells. Since it was considered standard practice to keep water content as low as possible in the $Li/MnO_2$ cell, it is natural to extend this practice to more recent primary lithium cells, in particular the $Li/FeS_2$ cell. With respect to the $Li/FeS_2$ primary cell, the reference US 2005/0277023 A1 teaches that water is an electrolyte contaminant and there should be no more than 500 ppm by weight water in the electrolyte. (para. 122, lines 1-5)

Certain aqueous electrolyte systems, that is, electrolyte systems with added water therein, may have higher electrical conductivity than organic non aqueous electrolyte systems. This is because water may typically promote better ionization of the electrolyte salt than an organic solvent. However in lithium cells, such as the $Li/MnO_2$, it has been considered important to restrict water content in the electrolyte solvent to trace amount and not to add water, primarily because water can react with lithium metal and also with electrolyte material including electrolyte solvent. This can produce a reaction product which coats the surface of the lithium anode. Such coating may be termed a "passivation layer" on the lithium anode surface which has the potential of significantly reducing the discharge performance and efficiency of the cell. However, not all "passivation layers" on the lithium anode are the same. That is, the chemical composition of such passivation layer and its rate of buildup (stability) on the surface of the anode may differ depending on the amount of water added to the electrolyte and the specific electrolyte salt and electrolyte solvents which are employed.

Thus, Applicants herein have determined that depending on the chemical composition of the electrolyte, which includes specific electrolyte salt and solvents employed, and the amount of added water, it is possible to produce a passivation layer on the lithium anode for the $Li/FeS_2$ cell which does not significantly compromise cell performance. At the same time, because water is added to the electrolyte, the electrolyte is more conductive, thus promoting very good cell discharge performance overall for the Li/FeS$_2$ cell.

The cathode material may be initially prepared in the form of a slurry mixture, which can be readily coated onto a substrate, typically a metal substrate, by conventional coating methods. The electrolyte added to the cell is a suitable electrolyte for the Li/FeS$_2$ system allowing the necessary electrochemical reactions to occur efficiently over the range of high power output desired. The electrolyte must exhibit good ionic conductivity and also be sufficiently stable, that is non reactive, with the undischarged or partially discharged electrode materials (anode and cathode components) and also non reactive with the discharge products. This is because undesirable oxidation/reduction reactions between the electrolyte and electrode materials (either discharged or undischarged or partially discharged) could gradually contaminate the electrolyte and reduce its effectiveness or result in excessive gassing. This in turn can result in a cell failure. Thus, the electrolyte used in a Li/FeS$_2$ cell in addition to promoting the necessary electrochemical reactions, should also be stable in contact with discharged, partially discharged and undischarged electrode materials. The electrolyte solvent should enable good ionic mobility and transport of the lithium ion (Li$^+$) from anode to cathode so that it can engage in the necessary reduction reaction resulting in Li$_2$S product in the cathode.

Primary lithium cells are in use as a power source for digital flash cameras, which require operation at higher pulsed power demands than is supplied by individual alkaline cells. Primary lithium cells are conventionally formed of an electrode composite comprising an anode formed of a sheet of lithium (or lithium alloy, essentially of lithium), a cathode formed of a coating of cathode active material comprising FeS$_2$ on a conductive metal substrate (cathode substrate) and a sheet of electrolyte permeable separator material therebetween. A microporous polypropylene separator for a lithium cell is disclosed, for example, in U.S. Pat. No. 4,794,057. The electrode composite may be spirally wound and inserted into the cell casing, for examples, as shown in U.S. Pat. No. 4,707,421.

A portion of the spiral wound anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The anode in a Li/FeS$_2$ cell can be formed by laminating a layer of lithium metal or lithium alloy on a metallic substrate such as copper. However, the anode may be formed of a sheet of lithium or lithium alloy without any substrate.

The electrolyte used in primary Li/FeS$_2$ cells is formed of a "lithium salt" dissolved in an "organic solvent". The electrolyte must promote ionization of the lithium salt and provide for good ionic mobility of the lithium ions so that the lithium ions may pass at good transport rate from anode to cathode through the separator. Representative lithium salts which may be used in electrolytes for Li/FeS$_2$ primary cells are referenced in U.S. Pat. No. 5,290,414 and U.S. Pat. No. 6,849,360 B2 and include such salts as: Lithium trifluoromethanesulfonate, LiCF$_3$SO$_3$ (LiTFS); lithium bistrifluoromethylsulfonyl imide, Li(CF$_3$SO$_2$)$_2$N (LiTFSI); lithium iodide, LiI; lithium bromide, LiBr; lithium tetrafluoroborate, LiBF$_4$; lithium hexafluorophosphate, LiPF$_6$; lithium hexafluoroarsenate, LiAsF$_6$; lithium methide, Li(CF$_3$SO$_2$)$_3$C; LiClO$_4$; lithium bis(oxalato)borate, LiBOB and various mixtures. In the art of Li/FeS$_2$ electrochemistry lithium salts are not always interchangeable as specific salts work best with specific electrolyte solvent mixtures.

In U.S. Pat. No. 5,290,414 (Marple) is reported use of a beneficial electrolyte for FeS$_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the 1,2-dimethoxyethane (DME) is present in the electrolyte in substantial amount, i.e., at either 40 or 75 vol. % (col. 7, lines 47-54). A specific lithium salt ionizable in such solvent mixture(s), as given in the example, is lithium trifluoromethane sulfonate, LiCF$_3$SO$_3$. Another lithium salt, namely lithium bistrifluoromethylsulfonyl imide, Li(CF$_3$SO$_2$)$_2$N is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,849,360 B2 (Marple) is disclosed a specific preferred electrolyte for an Li/FeS$_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48) The electrolyte is typically added to the cell after the dry anode/cathode spiral with separator therebetween is inserted into the cell casing.

In US 2007/0202409 A1 (Yamakawa) it is stated with reference to the electrolyte solvent for the Li/FeS$_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the Li/FeS$_2$ cell depending on the particular lithium salt to be dissolved in the solvent. (See, e.g. above U.S. Pat. Nos. 5,290,414 and 6,849,360) The reference Yamakawa does not teach which combination of solvents from the above list are to be used with any given lithium salt.

Conventional FeS$_2$ powders, for example Pyrox Red 325 powder from Chemetall GmbH, are conventionally available with pH raising additives therein to offset or retard any buildup in acidity of the powder. Such additives are believed to contain calcium carbonate (CaCO$_3$) or calcium carbonate linked to other compounds. Such calcium carbonate is added to the FeS$_2$ powder to retard the formation of acidic impurities within or on the surface of the powder as it is stored in ambient air and exposed to oxygen and moisture. This is regardless of whether the FeS$_2$ is intended for use in cathode mixtures or other applications, for example, as an additive in manufacture of car brakes.

Accordingly, it is desired to realize the benefit of improving the electrical conductivity of one or more organic electrolyte systems for the Li/FeS$_2$ cell by adding water to the electrolyte.

It is desired to find a range of amount water that can be added to the Li/FeS$_2$ electrolyte in order to realize beneficial cell performance resulting from improved electrolyte conductivity, while containing deleterious side reactions from reaction of water with cell components.

It is desired to produce a primary (nonrechargeable) Li/FeS$_2$ cell having good rate capability that the cell may be used in place of rechargeable batteries to power digital cameras.

SUMMARY OF THE INVENTION

The present invention is directed to a primary electrochemical cell having an anode comprising lithium or lithium alloy as anode active material and a cathode comprising iron disulfide (FeS$_2$) as cathode active material. The anode and cathode are typically spirally wound with a separator sheet therebetween to form an electrode assembly. An electrolyte solution is added to the cell after the wound electrode assembly is inserted into the cell casing. The electrolyte typically comprises a lithium salt dissolved in an organic solvent mixture. A preferred electrolyte solution comprises a mixture of Li(CF$_3$SO$_2$)$_2$N (LiTFSI) salt dissolved in a solvent mixture of 1,3 dioxolane (70-80 vol %) and sulfolane (20-30 vol %), as in commonly assigned WO 2008/012776 A2. Pyridine in amount between about 0.05 and 1.0 wt. %, for example about 0.1 wt. % is added to the electrolyte to reduce the chance of minor amounts of polymerization of 1,3-dioxolane.

In a principal aspect it has been determined that a certain amount of water may be added to the electrolyte solution without significantly adversely affecting the cell's performance during normal usage. In particular it has been determined that water may be added to the electrolyte so that the water content in the electrolyte may be up to about 1000 parts by weight water per million parts by weight (ppm) electrolyte. Surprisingly, it has been determined that water content in the electrolyte up to about 1000 ppm of the electrolyte does not noticeably adversely affect cell performance during normal usage conditions, for example, if the cell were to be used to power a digital camera.

Surprisingly, added water to the electrolyte, up to a level of about 1000 ppm total water content in the electrolyte improves the electrical conductivity of the electrolyte. It is theorized that the benefit derived from increased conductivity of the electrolyte offsets any increase in resistance of the "passivation layer" formed on the anode surface because of the elevated water content in the electrolyte. It is known that lithium cells develop a coating, commonly termed a "passivation layer" on the surface of the lithium anode, as the cell is left in storage or discharged during normal usage. However, not all "passivation layers" on the lithium anode are the same. The nature of the chemical composition of the passivation layer and its rate of buildup on the lithium anode surface are factors which determine how deleterious this layer will be on the cell's performance. Lithium cells which have no added water content, for example, less than about 50 ppm water in the electrolyte still form passivation layers on the lithium anode as the cell discharges because of side reactions involving the electrolyte salt and electrolyte solvents with the lithium. It would be expected that adding water to the electrolyte so that the water content therein is over 100 ppm by weight, or over 200 ppm or over 500 ppm, for example, in particular between about 500 and 1000 ppm by weight water in the electrolyte would result in formation of a passivation layer on the anode surface which would significantly adversely affect cell performance.

However, data collected from Li/FeS$_2$ cell Digicam (ANSI digital camera) tests, designed to mimic cell performance in digital cameras, surprisingly did not show any noticeable reduction in discharge performance for cells with total water content in the electrolyte at levels between about 50 ppm and 1000 ppm. Any adverse cell performance was not noticeable as the cells' water content in the electrolyte was increased between 50 ppm and 1000 ppm even when the cells were subjected to various accelerated storage conditions before the Digicam test was applied. See Table 2—Test II and III cell storage at elevated temperatures before the Digicam test was applied.

This is achieved without noticeably causing adverse reaction between the water and the lithium anode to result in a passivation layer on the lithium anode surface which is much more deleterious to cell performance than normal passivation layers, that is, anode passivation layers which are formed at lower levels of water content in the electrolyte, for example, less than 50 ppm water by weight in the electrolyte. In any event any increase in buildup of the passivation layer on the lithium anode as a result of increased amount of water in the electrolyte up to a level of about 1000 ppm water, appears to be offset by increased conductivity of the electrolyte because of the added water content. This results in a net effect of no noticeable adverse affect on cell performance despite the water content in the electrolyte increased to a level between about 50 and 1000 ppm; between about 100 and 1000 ppm; between about 200 and 1000 ppm; and as well, between about 500 ppm and 1000 ppm, for example, between about 600 and 1000 ppm by weight water in the electrolyte.

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. The cell has a cathode comprising the cathode active material iron disulfide (FeS$_2$), commonly known as "pyrite". The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide (FeS$_2$) and carbon particles onto a substrate, preferably a conductive metal substrate. The FeS$_2$ and carbon particles are bound to the substrate using desirably an elastomeric, preferably, a styrene-ethylene/butylene-styrene (SEBS) block copolymer such as Kraton G1651 elastomer (Kraton Polymers, Houston, Tex.). This polymer is a film-former, and possesses good affinity and cohesive properties for the FeS$_2$ particles as well as for conductive carbon particle additives in the cathode mixture. The polymer resists chemical attack by the electrolyte.

The cathode is formed of a cathode slurry comprising iron disulfide (FeS$_2$) powder, conductive carbon particles, binder material, and solvent. (The term "slurry" as used herein will have its ordinary dictionary meaning and thus be understood to mean a wet mixture comprising solid particles.) The wet cathode slurry is coated onto a substrate which is preferably conductive such as a sheet of aluminum or stainless steel. The substrate functions as a cathode current collector. The solvent is then evaporated leaving a cathode composite formed of a dry cathode coating mixture comprising the iron disulfide material and carbon particles preferably including carbon black adhesively bound to each other and with the dry coating bound, preferably to the both sides of the substrate. An electrode assembly is then formed comprising a sheet of lithium or lithium alloy, the cathode composite sheet, and separator therebetween spirally wound and inserted into the cell casing. The electrolyte solution with added water therein is then poured into the cell casing and the cell crimped closed over an end cap.

The finding herein that the amount of permitted water by weight (ppm) in the electrolyte for the Li/FeS$_2$ cell can be up to about 1000 ppm, results in cost savings and savings in processing expense, since the need to thoroughly dry the electrolyte solvents or otherwise treat the electrolyte solvents to remove water therefrom can be avoided.

It is surprising that Li/FeS$_2$ cell performance as measured by various test protocols as reported herein do not show any noticeable deterioration in performance for cells with 50 ppm water, 100 ppm water, 200 ppm water, 500 ppm water, and 1000 ppm water. It is surprising in particular that the water content at the highest levels tested in Li/FeS$_2$ cells, that is, between about 500 and 1000 ppm, in the electrolyte does not appear to adversely effect cell performance as compared to same cell performance with lower water content, for example, 50 ppm or 100 ppm water in the electrolyte.

It is conjectured that the electrolyte composition used in the test cells, namely Li(CF$_3$SO$_2$)$_2$N (LiTFSI) salt, dissolved in electrolyte solvent comprising 1,3-dioxolane (70-80 vol %), and sulfolane (20-30 vol %), may be a factor in achieving the good results reported in Li/FeS$_2$ cell performance despite the higher water content in the cell, that is, in the range between about 50 and 1000 ppm, between about 100 and 1000 ppm, between about 200 and 1000 ppm, between about 500 and 1000 ppm water, and between about 600 and 1000 ppm water in the electrolyte. Predischarge of the cells wherein the cells are subjected to series of about 2 Amp pulses, each pulse for about 7 seconds duration "on" and 20 seconds "off", utilizing 3% of the cells' capacity, can also be a factor in achieving good performance despite the presence of water in the electrolyte. This is because such predischarge protocol helps to establish a stable passivation layer on the lithium anode even in the presence of water in the electrolyte. It is believed that lithium iodide (LiI) can also be used in place of the Li(CF$_3$SO$_2$)$_2$N (LiTFSI) salt with the above electrolyte and water contents.

Based on the Li/FeS$_2$ cell tests in Table 2 and 2A, and electrolyte conductivity measurements as presented in Table 3, for the Li/FeS$_2$ cell, it is believed that electrolytes with the above water content between about 50 and 1000 ppm, between about 100 and 1000 ppm, between about 200 and 1000 ppm, between about 500 and 1000 ppm water, and between about 600 and 1000 ppm, could be utilized in electrolytes with other lithium salts, particularly lithium iodide. It is believed further that the upper limit of water content in the electrolyte for the Li/FeS$_2$ cell can be extended to about 2000 ppm based on the trend of the current data.

BRIEF DESCRIPTION OF THE DRAWINGS

FIG. 4 is a schematic showing the placement of the layers comprising the electrode assembly.

FIG. 5 is a plan view of the electrode assembly of FIG. 4 with each of the layers thereof partially peeled away to show the underlying layer.

DETAILED DESCRIPTION

Figure 1:
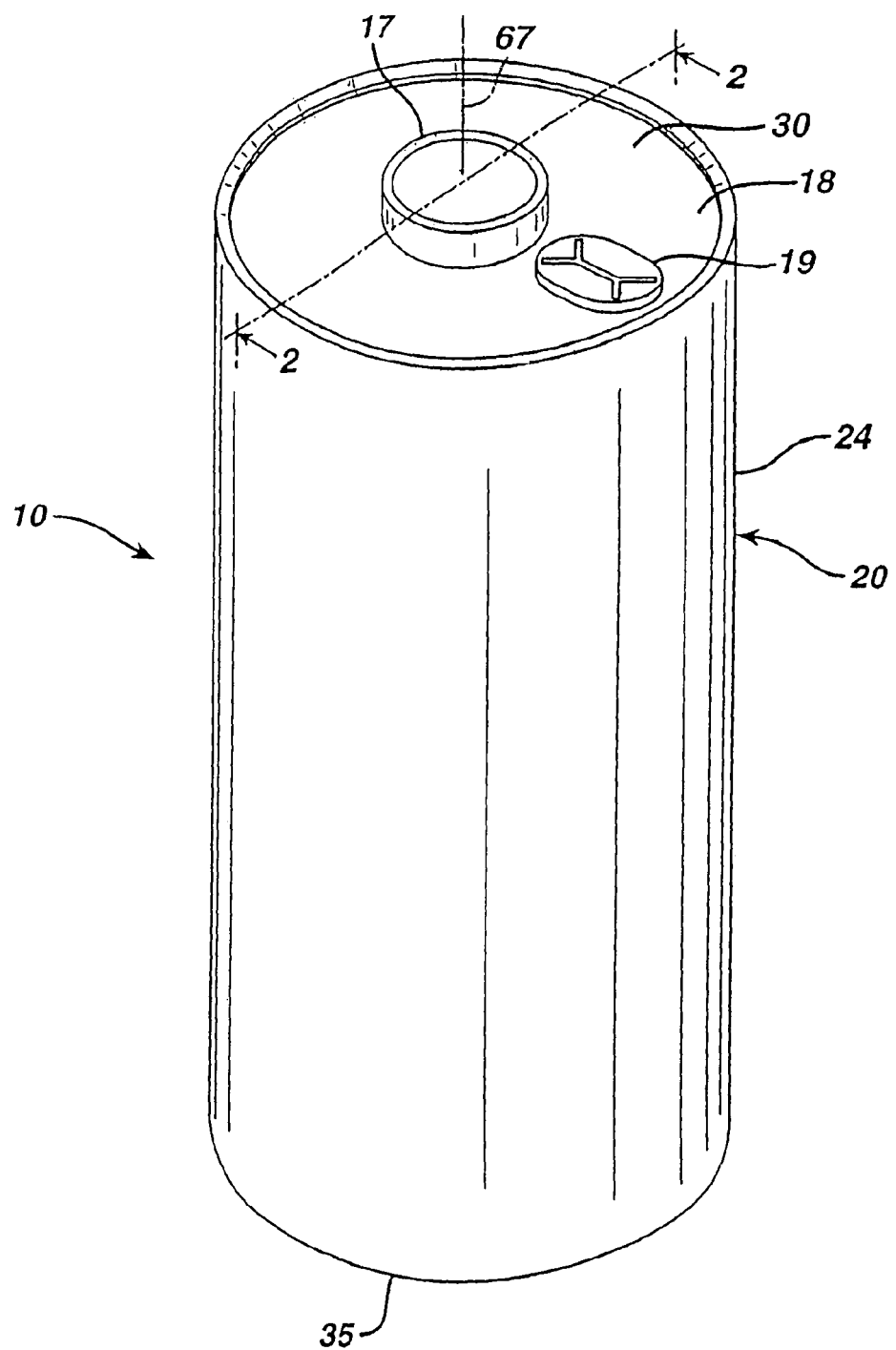
FIG. 1 is an isometric view of an improved Li/FeS$_2$ cell of the invention as presented in a cylindrical cell embodiment.

The Li/FeS$_2$ cell of the invention is desirably in the form of a spirally wound cell as shown in FIGS. 1-5. A desirable wound cell 10 configuration comprising a lithium anode 40 and a cathode composite 62 comprising iron disulfide (FeS$_2$) with separator sheet 50 therebetween is shown in the figures. The anode may comprise a sheet of lithium or lithium alloy 40. The cathode composite may comprise a coating of cathode material 60 comprising iron disulfide (FeS$_2$) which is coated on at least one side of a substrate 65 as shown best in FIGS. 4 and 5. The cathode material 60 may also be coated on both sides of substrate 65. The substrate or grid 65 is preferably an electrically conductive substrate, such as a sheet of aluminum, or stainless steel foil. The conductive substrate 65 may be a continuous solid sheet without apertures or may be a sheet with apertures therein. For example, substrate 65 may be formed from expanded stainless steel foil or expanded aluminum foil or from piercing the sheet with small apertures.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum or lithium and calcium. In such case the alloy metal, is present in very small quantity, preferably less than 1 or 2 percent by weight of the lithium alloy. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm, preferably about 0.15 mm for the spirally wound cell.

The Li/FeS$_2$ cell as in cell 10 has the following basic discharge reactions (one step mechanism):

Anode:

$$4Li = 4Li^+ + 4e^- \qquad\qquad \text{Eq. 1}$$

Cathode:

$$FeS_2 + 4Li^+ + 4e^- = Fe + 2Li_2S \qquad\qquad \text{Eq. 2}$$

Overall:

$$FeS_2 + 4Li = Fe + 2Li_2S \qquad\qquad \text{Eq. 3}$$

The theoretical specific capacity (mAmp-hr/g) of FeS$_2$ can be calculated as follows based on a 4 electron transfer per molecule, wherein 2 electrons reduce Fe$^{+2}$ to elemental iron Fe and 2 electrons reduce S$^{-1}$ to 2S$^{-2}$ forming Fe+2Li$_2$S. The molecular weight (M.W.) of FeS$_2$ is 119.98 and the M.W. of Li is 6.941. The charge q$_o$ of an electron is $1.602 \times 10^{-19}$ coulomb. 1 coulomb=1 Amp-sec. Avogadro's number A$_0$ is $6.023 \times 10^{23}$ molecules per mol. Let F=(q$_o$×A$_0$)/3600 sec/hr=26.802 Amp-hr. The theoretical specific capacity of FeS$_2$ can be calculated as $26.802 \times 4/119.97 = 0.8935$ Amp-hr/g=893.5 mAmp-hr/g. The theoretical specific capacity of Li can be calculated as $26.802 \times 1/6.941 = 3.8614$ Amp-hr/g=3861.4 mAmp-hr/g. In a specific embodiment herein lithium is the only anode active material and FeS$_2$ is the only cathode active material. In that case the theoretical capacity of the anode is the theoretical specific capacity of lithium times the weight of lithium facing the cathode with separator therebetween so that the lithium is dischargable. The theoretical capacity of the cathode is the theoretical specific capacity of the $FeS_2$ times the weight of $FeS_2$ in the cathode facing the anode with separator therebetween so that the $FeS_2$ is dischargeable.

In general the theoretical capacity of the anode involves computing the ideal capacity (mAmp-hrs) of all the anode active materials therein, and the theoretical capacity of the cathode involves computing the ideal capacity (mAmp-hrs) of all the cathode active materials therein. It shall be understood that the use of such terms theoretical capacity of anode and theoretical capacity of cathode as used in the present application shall be so defined. The "anode active" materials and "cathode active" materials are defined as the materials in the anode and cathode, respectively, which are capable of useful electrochemical discharge. That is, the "anode active materials" and "cathode active materials" promote current flow between the cell's negative and positive terminals when an external circuit between these terminals is connected and the cell is used in normal manner.

The $Li/FeS_2$ cylindrical cell 10 may be in the form of a primary (nonrechargeable) cell.

The cathode material 60 of the invention comprising iron disulfide ($FeS_2$) or any mixture including iron disulfide ($FeS_2$) as active cathode material, may thus be coated onto one or both sides of conductive substrate 65 to form cathode composite sheet 62. The cathode active material, that is, the material undergoing useful electrochemical reaction, in cathode 60 can be composed entirely of iron disulfide ($FeS_2$) or may include another coactive material. The cathode 60 comprising iron disulfide ($FeS_2$) powder dispersed therein can be prepared in the form of a wet slurry comprising a mixture of iron disulfide powder, carbon particles, polymeric binder and solvents mixed therein. The wet slurry is coated on one side of the conductive metal foil 65, preferably an aluminum or stainless steel foil as above indicated. The wet coating 60 on substrate 65 may then be dried in a conventional convective air oven to evaporate the solvents. Then a coating of the wet slurry may optionally also be applied to the opposite side (not shown) of conductive substrate 65. In such case the wet coating on the opposite side of conductive substrate 65 is similarly dried in a convective air oven to evaporate solvents. A cathode composite sheet 62 is formed with dry cathode coating 60 on one or both sides of conductive substrate 65. The cathode composite sheet 62 can then be calendered resulting in a compacted smooth dry cathode coating 60 on conductive substrate 65.

The cathode slurry desirably comprises 2 to 4 wt % of binder (Kraton G1651 elastomeric binder from Kraton Polymers, Houston Tex.); 50 to 70 wt % of active $FeS_2$ powder; 4 to 7 wt % of conductive carbon (carbon black and graphite); and 25 to 40 wt % of solvent(s). (The carbon black is preferably acetylene carbon black. However, the carbon black may include in whole or in part other carbon black, such as carbon black made from the incomplete combustion or thermal decomposition of natural gas or petroleum oil. Thus, the term carbon black as used herein shall be understood to extend to and include acetylene black and such other carbon black.) The Kraton G1651 binder is a polymeric elastomeric block copolymer (styrene-ethylene/butylene (SEBS) block copolymer) which is a film-former. The Kraton polymeric binder is soluble in the solvents employed in forming the wet cathode slurry. Kraton binder has excellent film forming properties and readily disperses over the iron disulfide particles and conductive carbon particles to help keep these particles in contact with each other. That is, the binder possesses sufficient affinity for the active $FeS_2$ and carbon black particles to facilitate preparation of the wet cathode slurry and to keep these particles in contact with each other in a network after the solvents are evaporated. The Kraton binder is also stable in the electrolyte which is subsequently added to cell after the anode 40, cathode 62 with separator 50 therebetween are wound and inserted into the cell casing. The Kraton binder is chemically and electrochemically resistant so that it does not react with the electrolyte or other cell contents during cell storage or discharge, even over a wide range of environmental conditions between about $-10°$ C. and $70°$ C.

The $FeS_2$ powder may have an average particle size between about 1 and 100 micron, desirably between about 10 and 50 micron and a BET surface area typically between about 0.8 and 1.5 $m^2/g$. A desirable $FeS_2$ powder is available under the trade designation Pyrox Red 325 powder from Chemetall GmbH, wherein the $FeS_2$ powder has a particle size sufficiently small that of particles will pass through a sieve of Tyler mesh size 325 (sieve openings of 0.045 mm). (The residue amount of $FeS_2$ particles not passing through the 325 mesh sieve is 10% max.) The Pyrox Red 325 $FeS_2$ had an average particle size of between about 20 and 26 micron and a typical BET surface area of about 1.1 $m^2/g$ and density of 4.7 $gm/cm^3$. The graphite is available under the trade designation TIMREX KS6 graphite from Timcal America. TIMREX graphite is a fairly high crystalline synthetic graphite, BET surface area 20 $m^2/g$, density 2.25 $g/cm^3$. (Other graphites may be employed selected from natural, synthetic, or expanded graphite and mixtures thereof, but the TIMREX graphite from Timcal is preferred because of its high purity.) The carbon black is preferably an acetylene black available under the trade designation Super P conductive carbon black (BET surface area of 62 $m^2/g$, bulk density in bag 0.160 $g/cm^3$,) from Timcal Co. Super P acetylene black has a pH of about 10 as measured by ASTM D1512-95. Other suitable carbon blacks are available from Timcal Co. under the trade designations ENSACO Granular, ENSACO P, SUPER S, SUPER S-Li, and SUPER P-Li. These latter carbon blacks have a pH of between about 6 and 11 as measured by ASTM-D1512 or the equivalent International Standard Ref. No. ISO 787/9-1981(E).

Solvents are mixed into the $FeS_2$ powder, carbon particles, and polymeric binder to form the wet cathode slurry to be coated onto substrate 65 as above indicated. In a preferred mixing sequence solvents are mixed first with binder to form a binder/solvent mixture. $FeS_2$ and carbon particles may be separately premixed and then added to the binder/solvent mixture. The solvents preferably include a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as Shell Sol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders ($FeS_2$ powder and carbon particles) are first blended to ensure uniformity before being added to the Kraton G1651 binder solution in the mixing bowl. The solvents are then added and the components blended in the mixer and until a homogeneous slurry mixture is obtained.

A preferred cathode wet slurry mixture by way of non limiting example is presented in Table 1:

TABLE 1

Cathode Composition

| | Wet Cathode Slurry (wt. %) | Dry Cathode (wt. %) |
|---|---|---|
| Binder (Kraton G1651) | 2.0 | 3.01 |
| Hydrocarbon Solvent (ShellSol A100) | 13.4 | 0.0 |
| (ShellSol OMS) | 20.2 | 0.0 |
| $FeS_2$ Powder (Pyrox Red 325) | 58.9 | 88.71 |
| Graphite (Timrex KS6) | 4.0 | 6.02 |
| Acetylene Carbon Black (Super P) | 1.5 | 2.26 |
| Total | 100.0 | 100.00 |

This same or similar wet cathode slurry mixture (electrolyte not yet added to the cell) is disclosed in commonly assigned application Ser. No. 11/516,534, filed Sep. 6, 2006. The total solids content of the wet cathode slurry mixture as shown in above Table 1 is 66.4 wt. %. Thus, the acetylene black content in the dry cathode would be 2.26 wt. % and the graphite content in the dry cathode would be 6.02 wt. %.

The cylindrical cell 10 may have a spirally wound electrode assembly 70 (FIG. 3) comprising anode sheet 40, cathode composite 62 with separator sheet 50 therebetween as shown in FIGS. 2-5. The $Li/FeS_2$ cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide ($FeS_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm) or other cylindrical size. However, it is not intended to limit the cell configuration to cylindrical shape. Alternatively, the cell of the invention may have a spirally wound electrode assembly formed of an anode comprising lithium metal and a cathode comprising iron disulfide ($FeS_2$) made as herein described inserted within a prismatic casing, for example, a rectangular cell having the overall shape of a cuboid. The $Li/FeS_2$ cell is not limited to a spirally wound configuration but the anode and cathode, for example, may be placed in stacked arrangement for use in coin cells.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: In accordance with the method of the invention the cathode 60 comprising iron disulfide ($FeS_2$) powder dispersed therein can be initially prepared in the form of a wet slurry which is coated onto a side of conductive substrate sheet 65, preferably a sheet of aluminum or stainless steel which may be a solid sheet with or without apertures therethrough, to form a cathode composite sheet 62 (FIG. 4). Conventional roll coating techniques may be used to coat the wet slurry onto a side of conductive substrate 65 (FIGS. 4 and 5). If an aluminum sheet 65 is used it may be a solid sheet of aluminum without openings therethrough or may be a sheet of expanded or perforated aluminum foil with openings therethrough thus forming a grid or screen. The apertures in substrate sheet 65 may be the result of punching or piercing holes therein.

The wet cathode slurry mixture having the composition shown above in Table 1 comprising iron disulfide ($FeS_2$), binder, conductive carbon and solvents is prepared by mixing the components shown in Table 1 until a homogeneous mixture is obtained.

The above quantities of components (Table 1) of course can be scaled proportionally so that small or large batches of cathode slurry can be prepared. The wet cathode slurry thus preferably has the following composition: $FeS_2$ powder (58.9 wt. %); Binder, Kraton G1651 (2 wt. %); Graphite, Timrex KS6 (4.0 wt %), Acetylene Black, Super P (1.5 wt %), Hydrocarbon Solvents, ShellSol A100 (13.4 wt %) and ShellSol OMS (20.2 wt %).

The $FeS_2$ powder (Pyrox Red 325) may be used directly as obtained from the supplier, Chemetall GmbH. Such product may be obtained from the supplier with a $CaCO_3$ additive already mixed into the $FeS_2$ powder. The $CaCO_3$ may typically comprise up to 1.5 wt. % of the $FeS_2$ powder. The $CaCO_3$ (or $CaCO_3$ containing compound) is added by the supplier to raise the pH of the $FeS_2$ in order to extend its storage life. That is, the elevated pH of $FeS_2$ resulting from the addition of $CaCO_3$ is intended to retard the rate of buildup of acidic contaminants within or on the surface of the $FeS_2$ particles as the $FeS_2$ is exposed to or stored in ambient air.

When it is desired to prepare the wet cathode slurry, the premix of $FeS_2$ powder and acetylene carbon black, is removed from storage and readied for admixture with binder and solvent solution. The mixture is stirred with graphite, binder and solvent as above described until a homogenous mixture is obtained, thus forming the wet cathode slurry.

After the wet cathode slurry is formed (Table 1), the wet slurry is then coated onto a side of the conductive substrate 65. The conductive substrate 65 with wet cathode slurry coated thereon is then dried in conventional convective oven (or in inert gas) to evaporate the solvents in the slurry, thereby forming a dry cathode coating 60 on one side of conductive substrate 65 (FIGS. 4 and 5). The process is repeated, if desired, to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. The drying of the wet cathode slurry coated on the metal substrate 65 is accomplished preferably by gradually adjusting or ramping up the oven temperature (to avoid cracking the coating) from an initial temperature of 40° C. to a final temperature not to exceed 130° C. for about 7-8 minutes or until the solvent has substantially all evaporated. (At least about 95 percent by weight of the solvents are evaporated, preferably at least about 99.9 percent by weight of the solvents are evaporated.) The dry cathode coating 60 (whether applied to only one side or both sides of conductive substrate 65) is then subjected to calendering to compress the thickness of said dry cathode 60, thus forming the completed cathode composite 62 (FIGS. 4 and 5).

The anode 40 can be prepared from a solid sheet of lithium metal. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium which forms the anode active material, is preferably in the form of a thin foil. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

Figure 3:
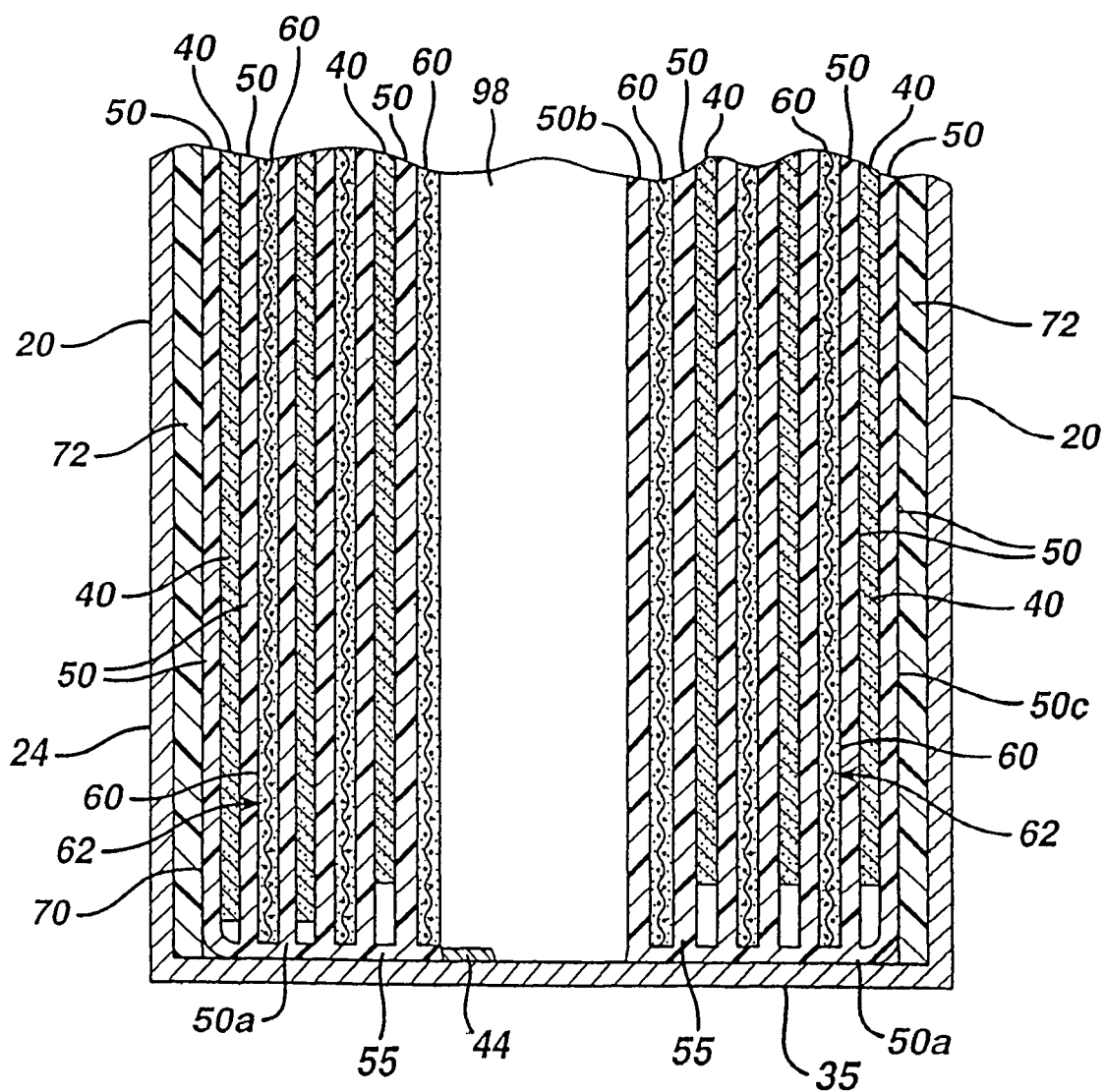
FIG. 3 is a partial cross sectional elevation view of the cell taken through sight lines 2-2 of FIG. 1 to show a spirally wound electrode assembly.

Individual sheets of electrolyte permeable separator material 50, preferably of microporous polypropylene or polyethylene having a thickness of about 0.025 mm or less is inserted on each side of the lithium anode sheet 40 (FIGS. 4 and 5). In a preferred embodiment the separator sheet may be microporous polyethylene or polypropylene of thickness about 0.016 mm. The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
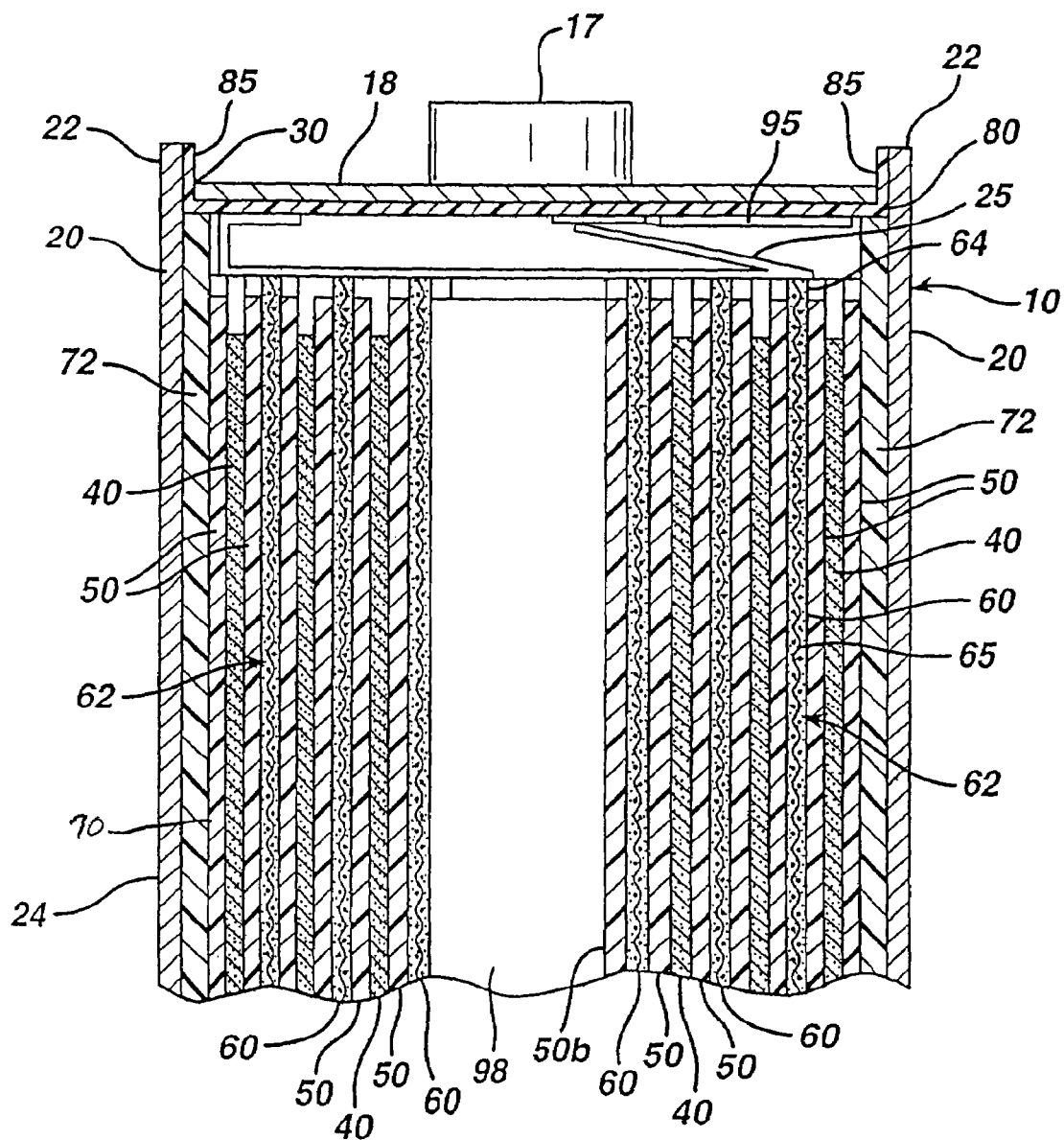
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polypropylene tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A electrolyte mixture can then be added to the wound electrode spiral 70 after it is inserted into the cell casing 20. The desired electrolyte comprises a lithium salt $LiCF_3SO_3$ (LiTFS) or $Li(CF_3SO_2)_2N$ (LiTFSI) dissolved in an organic solvent. A desirable electrolyte is comprised of a mixture of $Li(CF_3SO_2)_2N$ (LiTFSI) salt dissolved in a solvent mixture of 1,3 dioxolane (80 vol %) and sulfolane (20 vol %), as in commonly assigned WO 2008/012776 A2. Pyridine in amount between about 0.05 and 1.0 wt. %, for example about 0.1 wt. % is added to the electrolyte to reduce the chance for polymerization of 1,3-dioxolane. The electrolyte initially contains less than 50 parts by weight water per million parts by weight (ppm) electrolyte. It has been determined useful to add water to the electrolyte so that the total water content in the electrolyte (electrolyte salt plus solvents) is between about 50 and 1000 ppm; between about 100 and 1000 ppm; between about 200 and 1000 ppm or desirably between about 500 and 1000 ppm, for example, between about 600 and 1000 ppm by weight water in the electrolyte.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 extends into portion 64 extending from the top of the wound spiral as shown in FIG. 2. The cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel, or nickel plated steel, can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of closed end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp in a AA size cell for a prolonged period, the resistance of the PTC device increases dramatically, thus shutting down the abnormally high drain. It will be appreciated that devices other than vent 19 and PTC device 95 may be employed to protect the cell from abusive use or discharge.

Test Protocol

AA size $Li/FeS_2$ test cells (49×12 mm) were made fresh as described above. The cathode coating 60 had the composition as shown in Table 1. The cathode 60 was coated on both sides of a sheet of aluminum foil substrate 65 of thickness 1 mil (0.025 mm) without any opening therethrough. The separator was of microporous polypropylene (Celgard 2400) of 1 mil (0.025 mm) thickness. The anode 40 comprised a sheet of lithium metal. The cathode contained 5.0 g iron disulfide ($FeS_2$) as cathode active material. The cells had an interfacial surface area between 2 anode and cathode with separator therebetween of about 300 cm. The cells were balanced so that the theoretical capacity of the anode was greater than the theoretical capacity of the cathode. Specifically, the test cells were balanced so that the ratio of the theoretical capacity of the anode to the theoretical capacity of the cathode was about 0.9. (The theoretical capacity of the anode is the theoretical specific capacity of lithium metal, 3861.4 mAmp-hr/gram, times the weight in grams of the lithium and the theoretical capacity of the cathode is the theoretical specific capacity of $FeS_2$, 893.5 mAmp-hr/gram, times the weight in grams of the $FeS_2$.)

A dry electrode assembly 70 comprising spirally wound anode 40, cathode 60 with separator 50 therebetween was inserted into cylindrical casing 20 as above described forming the cell. Then the electrolyte was added to the cell. The electrolyte added to the cell comprised a mixture of $Li(CF_3SO_2)_2N$ (LiTFSI) salt (0.8 mols/liter) dissolved in a solvent mixture of 1,3 dioxolane (80 vol %) and sulfolane (20 vol %), as in commonly assigned WO 2008/012776 A2. Also, 0.1 wt. % pyridine was added to form the final electrolyte solution. (The pyridine desirably in amount between about 0.05 and 1.0 wt. % is added to the electrolyte to reduce the chance of minor amounts of polymerization of 1,3-dioxolane.) The electrolyte mixture was added on the basis of about 0.4 gram electrolyte solution per gram $FeS_2$ for the spirally wound cell (FIG. 2). The cells were identical in every respect and contained the same anode, cathode, separator and electrolyte composition except that varying amounts of water were present in the electrolyte. The water content as reported herein (Table 2) is the amount of total water in the electrolyte, parts water per million parts by weight electrolyte (ppm), wherein the electrolyte includes the electrolyte salts and all electrolyte solvents blended therein. (Initially the electrolyte solvent contained less than 50 ppm water as received from the supplier.)

The AA size cells with different amount of water in the electrolyte were divided into their respective Test Batches A, B, C, D, and E. The respective batches of cells contained the following amount of water (ppm) in the electrolyte. The Batch A is the control batch with less than 50 ppm water in the electrolyte. The Batch B contained 100 ppm water in the electrolyte. Batch C contained 200 ppm water in the electrolyte. Batch D contained 500 ppm water in the electrolyte. The Batch E cells contained 1000 ppm water in the electrolyte.

Batches B, C, D, and E electrolytes were made by adding enough deionized water to Batch A electrolyte in order to raise the water content in the electrolyte to the above specified amounts, namely, Batch B at 100 ppm water; Batch C at 200 ppm water; Batch D at 500 ppm water; and Batch E at 1000 ppm water. The added water was a purified water, namely deionized water.

In each of the batches of cells A, B, C, D, and E having a different water content in the electrolyte, a number of identical cells were made. The identical cells from each of the batches A, B, C, D, and E were divided up into four groups, I, II, III, and IV. There were between 5 and 10 identical cells per group I, II, III, and IV, for each of the batches. Each of these four groups of cells I, II, III, and IV within each batch A, B, C, D, and E were subjected to different test protocols.

The test protocols were designed in part to test the effect of the water content in the electrolyte on cell impedance and OCV (open circuit voltage) after storage. Such measurement is designed to provide an indication of rate of buildup of deleterious passivation layer on the lithium anode surface as a result of adding more water to the electrolyte. In order to make such tests all the fresh cells in each batch A, B, C, D, and E were first slightly predischarged, thereby discharging about 3 percent of the cell's capacity. All cells were then immediately stored for 14 days at ambient room temperature (20° C.). The cell's impedance and OCV were then measured for all the cells after the 14 day storage period. At this point the cells in each batch A, B, C, D, and E (each batch having different water content) were divided into four groups I, II, III, and IV containing between 5 and 10 cells per group.

The following test protocols was applied to the four groups of identical cells I, II, III, and IV within each of the batches A, B, C, D, and E. (As above indicated batch A contained less than 50 ppm water in the electrolyte; batch B contained 100 ppm water in the electrolyte; batch C contained 200 ppm water in the electrolyte; batch D contained 500 ppm water in the electrolyte; and batch E contained 1000 ppm water in the electrolyte).

In the Group I tests after the fresh cells were predischarged (wherein the predischarge protocol was a series of cycles, each cycle consisting of about 2 Amp pulse "on" for 7 seconds followed by 20 seconds "off" to remove about 3% of cell capacity) and stored for 14 days at ambient room temperature (20° C.), the cells impedance and OCV were measured. The cells were then subjected to the Digicam Test (described below) designed to simulate use in digital cameras. The results of the Digicam test were recorded and the cells from this group were discarded. (Test results reported in Table 2.)

In the Group II tests after the fresh cells were predischarged (wherein the predischarge protocol was a series of cycles, each cycle consisting of about 2 Amp pulse "on" for 7 seconds followed by 20 seconds "off" to remove about 3% of cell capacity) and stored for 14 days at ambient room temperature (20° C.), the cells impedance and OCV were measured. The cells were then subjected to additional (accelerated) storage at elevated temperature of about 60° C. for 20 days. At the end of this accelerated storage period these cells were subjected to the impedance and OCV test again followed by the DIGICAM test. (Test results reported in Table 2)

In the Group III tests after the fresh cells were predischarged (wherein the predischarge protocol was a series of cycles, each cycle consisting of about 2 Amp pulse "on" for 7 seconds followed by 20 seconds "off" to remove about 3% of cell capacity) and stored for 14 days at ambient room temperature (20° C.), the cells impedance and OCV were measured. The cells were then subjected to discharge at 0.25 Amp constant current for 8 hours to discharge approximately 65 percent of the cells' capacity. The cells impedance and OCV were measured again at this time. The cells were then subjected to accelerated storage at elevated temperature of about 60° C. for 20 days. The cells impedance and OCV were measured and the cells then subjected to the Digicam test. (Test results reported in Table 2)

In the Group IV tests after the fresh cells were predischarged (wherein the predischarge protocol was a series of cycles, each cycle consisting of about 2 Amp pulse "on" for 7 seconds followed by 20 seconds "off" to remove about 3% of cell capacity) and stored for 14 days at ambient room temperature (20° C.), the cells impedance and OCV were measured. After impedance measurements, the cells were subjected to 3 Amp pulse of constant current for 0.5 seconds (Electrical test) to evaluate a build up of passive layer on the lithium anode because of added water to electrolyte. This evaluation is done based on the difference between cell OCV (Open Circuit Voltage) and cell CCV (closed Circuit Voltage, that is, the load voltage) under a constant current "I" of 3 Amp load. The difference in OCV and CCV reflects the cell's internal resistance. That is, OCV−CCV=$V_{int}$ ($V_{int}$=IR$_{int}$, wherein R$_{int}$ is the cell's internal resistance.) The buildup of the passivation layer on the lithium anode will increase the cell's internal resistance, R$_{int}$. So conversely, the cell's internal resistance, R$_{int}$, is a reflection of the buildup of the passivation layer on the anode. As above indicated the cell's internal resistance varies directly with the difference OCV−CCV at a given current drain.

Since resistance of lithium passivation layer can change because of different amount of water added to the electrolyte, it thus can be assessed by measuring the difference OCV−CCV in the Electrical test. The cells after storage at 20° C. at 14 days followed by Impedance and the Electrical test were then subjected to 100 pulsed cycles using the DIGICAM test followed by one week storage at 60° C. (Each cycle consists of both a 1.5 Watt pulse for 2 seconds followed immediately by a 0.65 Watt pulse for 28 seconds.) After 100 such pulsed cycles the cells were subjected to one week storage at 60° C. After being cooled down for 4 hours to room temperature (20° C.) the cells were again subjected to the Electrical test (3 Amp pulse of constant current for 0.5 seconds) followed by 100 pulsed cycles (each cycle consisting of 1.5 Watt pulse for 2 seconds followed immediately by 0.65 Watt pulse for 28 seconds). After these 100 pulsed cycles, the cells were subjected to one week storage at 60° C. storage. Again after being cooled down for 4 hours to room temperature (20° C.) the cells were again subjected to the Electrical test (3 Amp pulse of constant current for 0.5 seconds and the OCV−CCV values in volts were recorded). The OCV−CCV values were recorded at this point in the cycle against week number for each of the cell batches until the cells were fully discharged. The difference between OCV and CCV (volts) is recorded and presented in Table 2A for each of the cell batches A, B, C, D, and E against week number as the electrical test was applied at the end of each 100 pulsed cycle after the above described one week storage period.

TABLE 2

Discharge Test Results for Li/FeS$_2$ Cells
Digicam Test Results - Total Pulsed
Cycles For Various Test Protocols

| Water Content In Electrolyte For Li/FeS$_2$ Cells[1] | Test Protocol | | |
|---|---|---|---|
| | I[2] | II[3] | III[4] |
| Cell A <50 ppm water | 578 | 584 | 187 |
| Cell B 100 ppm water | 574 | 584 | 189 |
| Cell C 200 ppm water | 593 | 581 | 184 |
| Cell D 500 ppm water | 597 | 587 | 186 |
| Cell E 1000 ppm water | 597 | 582 | 191 |

Notes:

[1] AA size Li/FeS$_2$ cylindrical cells, all the same except for water content in electrolyte. Initial water content was less than 50 ppm water in the electrolyte and enough water was added to the electrolyte to result in the above indicated water contents. The electrolyte was Li(CF$_3$SO$_2$)$_2$N (LiTFSI) salt (0.8 mols/liter) dissolved in a solvent mixture of 1,3 dioxolane (80 vol %) and sulfolane (20 vol %) with 0.1 wt % pyridine.

[2] Group I Tests - After the fresh cells were predischarged and stored for 14 days at ambient room temperature (20° C.), the cells impedance and OCV were measured. The cells were then subjected to the Digicam Test (described below) designed to simulate use in digital cameras. Total number of pulsed cycles reported. Each pulsed cycle consisting of a 1.5 Watt pulse for 2 seconds followed by a 0.65 Watt pulse for 28 seconds.

[3] Group II Tests - After the fresh cells were predischarged and stored for 14 days at ambient room temperature (20° C.), the cells impedance and OCV were measured. The cells were then subjected to additional (accelerated) storage at elevated temperature of about 60° C. for 20 days. At the end of this accelerated storage period these cells were subjected to the impedance and OCV test again followed by the DIGICAM test. Total number of pulsed cycles reported. Each pulsed cycle consisting of a 1.5 Watt pulse for 2 seconds followed by a 0.65 Watt pulse for 28 seconds.

[4] Group III Tests - After the fresh cells were predischarged and stored for 14 days at ambient room temperature (20° C.), the cells impedance and OCV were measured. The cells were then subjected to discharge at 0.25 Amp constant current for 8 hours to discharge approximately 65 percent of cell capacity. The cells impedance and OCV were measured again at this time. The cells were then subjected to accelerated storage at elevated temperature of about 60° C. for 20 days. The cells impedance and OCV were measured and the cells then subjected to the Digicam test. Total number of pulsed cycles reported. Each pulsed cycle consisting of a 1.5 Watt pulse for 2 seconds followed by a 0.65 Watt pulse for 28 seconds.

TABLE 2A

OCV-CCV for Cell Batches at Different Weeks
Tested Using A Constant Current Pulsed Electrical Test

| Li/FeS2 Cells[1] | Test Protocol - IV[2] | | | | | |
|---|---|---|---|---|---|---|
| Water Content In Electrolyte | OCV-CCV Week 0 | OCV-CCV Week 1 | OCV-CCV Week 2 | OCV-CCV Week 3 | OCV-CCV Week 4 | OCV-CCV Week 6 |
| Cell A <50 ppm water | 0.528 | 0.512 | 0.479 | 0.485 | 0.575 | 0.764 |
| Cell B 100 ppm Water | 0.533 | 0.531 | 0.490 | 0.498 | 0.61 | 0.811 |
| Cell C 200 ppm water | 0.532 | 0.532 | 0.481 | 0.513 | 0.654 | 0.793 |
| Cell D 500 ppm Water | 0.559 | 0.541 | 0.493 | 0.494 | 0.622 | 0.808 |

TABLE 2A-continued

OCV-CCV for Cell Batches at Different Weeks
Tested Using A Constant Current Pulsed Electrical Test

| Li/FeS2 Cells[1] | Test Protocol - IV[2] | | | | | |
|---|---|---|---|---|---|---|
| Water Content In Electrolyte | OCV-CCV Week 0 | OCV-CCV Week 1 | OCV-CCV Week 2 | OCV-CCV Week 3 | OCV-CCV Week 4 | OCV-CCV Week 6 |
| Cell E 1000 ppm water | 0.557 | 0.534 | 0.492 | 0.490 | 0.627 | 0.826 |

Notes:
[1]AA size Li/FeS$_2$ cylindrical cells, all the same except for water content in electrolyte. Initial water content was less than 50 ppm water in the electrolyte and enough water was added to the electrolyte to result in the above indicated water contents. The electrolyte was Li(CF$_3$SO$_2$)$_2$N(LiTFSI) salt (0.8 mols/liter) dissolved in a solvent mixture of 1,3 dioxolane (80 vol %) and sulfolane (20 vol %) with 0.1 wt % pyridine.
[2]Group IV Tests - After the fresh cells were predischarged and stored for 14 days at ambient room temperature (20° C.), the cells impedance and OCV were measured. After impedance measurements, the cells were subjected to 3 Amp pulse of constant current for 0.5 seconds (called the Electrical test) to evaluate a build up of passive layer on lithium anode because of added water to electrolyte. This evaluation is done based on the difference between cell OCV (Open Circuit Voltage) and cell CCV (Closed Circuit Voltage) under 3 Amp load. The cells after storage at 20° C. at 14 days were followed by Impedance and Electrical test and then subjected to 100 pulsed cycles using the DIGICAM test followed by one week storage at 60° C. (Each cycle consists of both a 1.5 Watt pulse for 2 seconds followed immediately by a 0.65 Watt pulse for 28 seconds.) After being cooled down for 4 hours to room temperature (20° C.) the cells were again subjected to the Electrical test (3 Amp pulse of constant current for 0.5 seconds) followed by 100 pulsed cycles (each cycle consisting of 1.5 Watt pulse for 2 seconds followed immediately by 0.65 Watt pulse for 28 seconds). After these 100 pulsed cycles, the cells were subjected to one week storage at 60° C. storage, followed by cooling down the cells for 4 hours to room temperature (20° C.). The cells were again subjected to the Electrical test (3 Amp pulse of constant current for 0.5 seconds and the OCV-CCV values recorded). The OCV-CCV values (volts) were recorded at this point in the cycle (after the 100 pulsed cycle and above described one week storage) against week number for each of the cell batches until the cells were fully discharged.

Digicam Test

The digital camera test (Digicam test) consists of the following pulse test protocol wherein each test cell was drained by applying pulsed discharge cycles to the cell: Each cycle consists of both a 1.5 Watt pulse for 2 seconds followed immediately by a 0.65 Watt pulse for 28 seconds. This is repeated 10 times followed by 55 minutes rest. Then the cycling is repeated until the cutoff voltage is reached. The cycles are continued until a cutoff voltage of 1.05V is reached. The number of cycles required to reach these cutoff voltages were recorded. (The number of pulses reported are the high 1.5 Watt pulses, which corresponds to the number of pulsed cycles.)

Microcalorimeter Test

Representative cells from each Batch of cells A, B, C, D, and E, wherein each batch were identical AA cells with different amount of water content in the electrolyte as above described, were subjected to a microcalorimeter measurement. This calorimeter test was made after the fresh cells from each batch were presdischarged, thereby discharging about 3 percent of the cell's capacity followed by storage for 14 days at ambient temperature at 20° C. The purpose of the microcalorimeter test is to determine if there is much difference in heat dissipation of the cells depending on the amount of added water (ppm) in the electrolyte. A CSC 4400 Isothermal Microcalorimeter from Calorimetry Sciences Corporation was used to measure the heat dissipation from the cell. The microcalorimeter measures the heat dissipation in the cell in microwatt-hrs until the cell reaches ambient temperature at 20° C. There were no discernible differences in heat output observed for all the tested cell groups irrespective the amount of water added to the electrolyte.

Electrolyte Conductivity Test

Samples of the same electrolyte which was used in the above AA test cells was made, except that different amounts of water were added to various samples. The electrolyte contained lithium bistrifluoromethylsulfonyl imide, Li(CF$_3$SO$_2$)$_2$N (0.8 mol/liter) dissolved in an organic solvent mixture containing dioxolane (80 vol. %) and sulfolane (20 vol. %), as described in commonly assigned WO 2008/012776 A2. There is about between about 600 and 1000 ppm of pyridine added to reduce the rate of minor dioxolane polymerization within the electrolyte.

Samples of the above indicated electrolyte composition with different amounts of water added, were subjected to a conductivity test. The electrolyte samples were designated E-1 (zero water added, total less than 50 ppm); E-2 (200 ppm added water); E-3 (400 ppm added water); E-4 (1000 ppm added water); E-5 (2000 ppm added water); and E-6 (3000 ppm added water). Each of electrolyte samples contained trace amounts of less than about 50 ppm water before any water was added to result in the indicated total water content. The specific conductivity of each of the electrolyte samples was measured and reported in milliSiemens/cm (mS/cm). (mS/cm=1/ρ, wherein ρ is the resistivity, milliohm×cm). The results of the specific conductivity measurements are summarized in Table 3.

TABLE 3

Electrolyte Conductivity vs Water Content

| Electrolyte[1] | Added Water Content[2], ppm | Specific Conductivity, mS/cm |
|---|---|---|
| E-1 (Control) | 0 | 8.08 |
| E-2 | 200 | 8.12 |
| E-3 | 400 | 8.15 |
| E-4 | 1000 | 8.59 |
| E-5 | 2000 | 8.68 |
| E-6 | 3000 | 8.76 |

Note:
[1]Li(CF$_3$SO$_2$)$_2$N (0.8 mol/liter) dissolved in solvent mixture of dioxolane (20 vol. %); sulfolane (80 vol. %) and pyridine (600 to 1000 ppm)
[2]The electrolyte initially contained less than 50 ppm water before water was added. The amount of added water is shown above in Table 3.

In order to carry out the electrolyte conductivity test a glass vial (¾ inch inner diameter) was first filled with the electrolyte solution. Each of the above electrolytes E-1 to E-6 (Table 3) was tested by adding the appropriate amount of water to the vial by syringe. The electrolytes were identical as above indicated except for the water content therein. The conductivity test was accomplished by first inserting a platinum plated electrode into a vial containing about 10.3 ml electrolyte solution. The tip of the electrode was submerged in about 6 cm height of electrolyte. The submerged electrode was composed of two electrode leads with a small gap therebetween. An AC current was applied between the two electrode leads. The AC current generating source had an amplitude of 10 millivolt and frequency of between about 100 and 100,000 Hertz. The impedance of the electrolyte between the electrode leads was measured using a Solartron 1287 electrochemical interface (potentiostat) coupled with a Solartron 1255B Frequency Response Analyzer (available from Solartron Co.). The conductivity of the electrolyte was back calculated from the electrolyte impedance and known gap space between the electrode leads. The same test was applied to each of the electrolyte solutions and the conductivity measurements are shown in Table 3.

Discussion of the Test Results

The above test results for the AA size $Li/FeS_2$ cells (Table 2) show that the total number of pulsed cycles achieved for each of the test protocols I, II, and III, surprisingly, did not decrease even though each of the cell groups A (<50 ppm water), B (100 ppm water), C (200 ppm water), D (500 ppm water), and E (1000 ppm water) had increasing amount of water as these cells were all subjected to test protocols I, II, and III. In addition the test protocols II and III included subjecting the cells to accelerated storage conditions (elevated temperature storage) before all of the Digicam tests were completed as shown in the Table 2 footnotes. This simulates and takes into account long term storage of the cells.

The test results for the AA size $Li/FeS_2$ cells (Table 2A) is consistent with the data in Table 2. The data in Table 2A shows that the Electrical test (OCV−CCV) does not vary much as a function of water content in the electrolyte at any given week number in which the Electrical test was applied. This indicates that the cell's internal resistance is stable despite the increase in water content of the cell batches tested. This in turn indicates that the passivation layer on the lithium anode was also stable despite the increased water content in the cell batches tested, since the passivation layer buildup is directly related to the cell's internal resistance.

Thus, it is concluded that the water content in the electrolyte for the $Li/FeS_2$ cell and in particular for the preferred electrolyte, $Li(CF_3SO_2)_2N$ (LiTFSI) salt dissolved in a solvent mixture of 1,3 dioxolane and sulfolane can be at least up to about 1000 ppm by weight water in the electrolyte.

Based on the $Li/FeS_2$ cell tests in Table 2 and 2A, and electrolyte conductivity measurements as presented in Table 3, it is believed that electrolytes with the water content between about 50 and 2000 ppm, between about 100 and 2000 ppm, between about 200 and 2000 ppm, between about 500 and 2000 ppm water, and between about 600 and 2000 ppm, could be utilized, particularly for an electrolyte solvent mixture comprising 1,3-dioxolane and sulfolane.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode comprising iron disulfide ($FeS_2$) and conductive carbon, said cell further comprising an electrolyte comprising a lithium salt dissolved in a solvent, wherein a water content in said electrolyte is between about 600 and 1000 parts by weight of purified water per million parts by weight electrolyte.

2. The cell of claim 1 wherein the said solvent comprises 1,3-dioxolane and sulfolane.

3. The cell of claim 1 wherein said electrolyte comprises a solvent comprising between about 70 and 80 percent by volume 1,3-dioxolane and between about 20 and 30 percent by volume sulfolane.

4. The cell of claim 1 wherein said anode and cathode are spirally wound with a separator sheet therebetween.

* * * * *